United States Patent
Balan et al.

(10) Patent No.: US 7,410,713 B2
(45) Date of Patent: Aug. 12, 2008

(54) INTEGRATED FUEL CELL HYBRID POWER PLANT WITH RE-CIRCULATED AIR AND FUEL FLOW

(75) Inventors: Chellappa Balan, Niskayuna, NY (US); David DeAngelis, Albany, NY (US)

(73) Assignee: General Electric Company, Niskayuna, NY (US)

( * ) Notice: Subject to any disclaimer, the term of this patent is extended or adjusted under 35 U.S.C. 154(b) by 920 days.

(21) Appl. No.: 10/248,166

(22) Filed: Dec. 23, 2002

(65) Prior Publication Data
US 2004/0121199 A1 Jun. 24, 2004

(51) Int. Cl.
*H01M 8/04* (2006.01)
*H01M 8/00* (2006.01)
*H01M 8/10* (2006.01)

(52) U.S. Cl. .............................. 429/17; 429/26; 429/12; 429/30

(58) Field of Classification Search .................... 429/14, 429/30, 17, 26, 12
See application file for complete search history.

(56) References Cited

U.S. PATENT DOCUMENTS

| | | | |
|---|---|---|---|
| 4,622,275 A | 11/1986 | Noguchi et al. | 429/19 |
| 4,743,516 A | 5/1988 | Noguchi et al. | 429/16 |
| 4,859,545 A * | 8/1989 | Scheffler et al. | 429/17 |
| 4,973,528 A * | 11/1990 | Sanderson | 429/12 |
| 5,084,363 A * | 1/1992 | Reiser | 429/19 |
| 5,319,925 A | 6/1994 | Hendriks et al. | 60/39.183 |
| 5,413,879 A | 5/1995 | Domeracki et al. | 429/30 |
| 5,449,568 A | 9/1995 | Micheli et al. | 429/20 |
| 5,482,791 A | 1/1996 | Shingai et al. | 429/635 |
| 5,541,014 A | 7/1996 | Micheli et al. | 429/19 |
| 5,750,278 A | 5/1998 | Gillett et al. | 429/24 |
| 5,811,202 A | 9/1998 | Petraglia | 429/35 |
| 5,963,201 A | 10/1999 | McGreggor et al. | 345/326 |
| 5,968,680 A | 10/1999 | Wolfe et al. | 429/13 |
| 6,007,931 A | 12/1999 | Fuller et al. | 429/13 |
| 6,230,494 B1 | 5/2001 | Botti et al. | 60/649 |

FOREIGN PATENT DOCUMENTS

JP     2002-260698     9/2002

* cited by examiner

*Primary Examiner*—Patrick Ryan
*Assistant Examiner*—Thomas H. Parsons
(74) *Attorney, Agent, or Firm*—Fletcher Yoder

(57) ABSTRACT

A hybrid power plant includes at least one fuel cell having a cathode inlet and a cathode outlet in flow communication with the cathode inlet along a re-circulation flow path. A reformer is configured to reform air and fuel, and the fuel cell includes an anode inlet in flow communication with the reformer and an anode outlet in flow communication with the reformer along a re-circulation flow path. Compressed air is supplied to a recuperator heated by turbine exhaust, and heated compressed air is mixed with re-circulated exhaust from the fuel cell prior to entering the fuel cell. A tail gas burner combusts a mixture of cathode exhaust and reformed residual fuel, and combustion gases are directed to the turbine.

7 Claims, 3 Drawing Sheets

INTEGRATED FUEL CELL HYBRID POWER PLANT WITH RE-CIRCULATED AIR AND FUEL FLOW

BACKGROUND OF INVENTION

This invention relates generally to power plants, and, more specifically, to hybrid power plants including integrated fuel cells.

In certain hybrid power generation systems, fuel cells have been integrated with conventional gas turbines for increased power generation capacity in electrical power plants. Known fuel cells, such as, for example, solid oxide fuel cells include a plurality of solid fuel cells that react a gaseous fuel, such as reformed natural gas, with air to produce electrical power and a hot gas. The gas turbine compressor supplies the air for the fuel cells, which operate at elevated pressure, and the fuel cells produce hot gas for expansion in the turbine. Fuel cell stack exhaust air is combined with fuel cell stack exhaust fuel and the resulting heat release is converted to work in the turbine portion of the plant. Thus, electrical power is produced by both the solid oxide fuel cell generator and the turbine. See, for example, U.S. Pat. No. 5,413,879. Known such systems, however, are disadvantaged in several aspects.

For example, the fuel cell stacks are required to operate within narrow temperature limits that are imposed by the physical and thermodynamic processes produced therein to generate electricity. Typically a regenerative heat exchanger is used to raise the inlet air stream of the fuel cell to an acceptable temperature. The regenerative heat exchanger introduces substantial cost and complexity to the power plant that can be prohibitive in certain applications.

In addition, once an acceptable inlet temperature for the fuel cells is achieved, maintaining a uniform fuel cell stack temperature and outlet temperature often necessitates a supply of air considerably in excess of that required to chemically generate electricity in the fuel cells. Supplying this excess air to maintain uniform temperatures in the fuel cell tends to result in large compression losses. The provision of excess air tends to reduce an inlet temperature of the turbine portion of the plant and to compromise overall thermodynamic efficiency of the system.

Still further, solid-oxide fuel cells usually do not convert all of the fuel that is fed into the inlet of the fuel cells. Composition of the outlet stream from the fuel cells primarily includes $CO$, $CO_2$, $H_2$, and $H_2O$ along with the equilibrium species. In the absence of means to burn the partly spent fuel, the heat content of these constituents is wasted, thereby reducing thermodynamic efficiency of the plant. Additionally, unburned hydrocarbons may also be undesirably emitted into the atmosphere when fuel for the fuel cells in not completely converted.

It would be desirable to provide a lower cost plant with reduced emissions and increased thermodynamic efficiency.

SUMMARY OF THE INVENTION

In one aspect, a hybrid power plant is provided. The plant comprises at least one fuel cell comprising a cathode inlet and a cathode outlet, said cathode outlet in flow communication with said cathode inlet along a re-circulation flow path.

In another aspect, a hybrid power plant is provided. The plant comprises a reformer configured to reform fuel, and at least one fuel cell comprising an anode inlet in flow communication with said reformer, said anode outlet in flow communication with said reformer along a re-circulation flow path.

In another aspect, a hybrid power plant is provided. The plant comprises a compressor, a recuperator in flow communication with said compressor, and at least one fuel cell in flow communication with said recuperator to provide air for said fuel cell. The fuel cell comprises a cathode inlet and a cathode outlet and, the cathode inlet is in flow communication with said recuperator for receiving compressed air.

In another aspect, a hybrid power plant is provided. The plant comprises a compressor, a recuperator in flow communication with said compressor, and a fuel cell stack in flow communication with said recuperator to provide air for said fuel cell stack. The fuel cell comprises a cathode inlet and a cathode outlet, and the cathode inlet is in flow communication with said cathode outlet for receiving compressed air. A recuperator is configured to transfer heat from exhaust of said turbine to compressed air prior to entering said cathode inlet.

In another aspect, a hybrid power plant is provided. The plant comprises a reformer and a fuel cell comprising an anode inlet in flow communication with said reformer. The anode outlet is in flow communication with said reformer along a re-circulation path, and a tail gas burner is in flow communication with said anode outlet. The tail gas burner combusts a mixture of air and an anode exhaust stream.

In another aspect, a hybrid power plant is provided. The plant comprises a gas turbine portion and a fuel cell portion. The gas turbine portion comprises a turbine, a compressor driven by said turbine, and a recuperator receiving air from said compressor which is heated by exhaust from the turbine. A fuel cell portion comprises a fuel cell stack comprising a cathode inlet and a cathode outlet. The recuperator supplies air to said cathode inlet, and the cathode outlet is in flow communication with said cathode inlet along a cathode re-circulation flow path. A blower is configured to re-circulate air from said cathode outlet to said cathode inlet. The fuel cell portion further comprises an anode inlet in flow communication with said reformer, and the anode outlet is in flow communication with said reformer along a re-circulation path. A reformer is in flow communication with said anode outlet along an anode re-circulation flow path, and a tail gas burner is in flow communication with said anode outlet and with said reformer. The tail gas burner receives a mixture of fuel exhaust from said anode outlet and a portion of air from said reformer, and the tail gas burner exhausts combustion gas to said turbine.

In another aspect, a power plant comprising a fuel cell comprising an anode, a cathode and an electrolyte interposed therebetween is provided. The cathode has a cathode inlet and a cathode outlet and an air re-circulation flow path connecting said cathode outlet to said cathode inlet for re-circulating a portion of a cathode outlet flow to heat a cathode inlet flow.

In another aspect, a tail gas burner system is provided. The system comprises at least one fuel cell comprising an anode, a cathode and an electrolyte interposed therebetween, said anode comprising an anode inlet and an anode outlet and said cathode comprising a cathode inlet and a cathode outlet. A tail gas burner comprises a tail gas inlet and a tail gas outlet coupled to said anode outlet and said cathode outlet for oxidizing at least a portion of an anode outlet flow with at least a portion of a cathode outlet flow to produce a tail gas burner outlet flow, and a tail gas bypass flow is connected to said cathode outlet and to said tail gas burner outlet for bypassing a portion of said cathode outlet flow around said tail gas burner.

In still another aspect, a method of integrating a gas turbine and fuel cell is provided. The fuel cell includes a cathode inlet and a cathode outlet and an anode inlet and an anode outlet, and the method comprises introducing a compressed air flow into the cathode inlet, introducing a compressed fuel flow into the anode inlet, and electrochemically reacting said air flow with said fuel flow within the fuel cell to generate an anode outlet flow and a cathode outlet flow and electric power. The anode outlet flow and said cathode outlet flow are at higher temperatures than the anode inlet flow and the cathode inlet flow, respectively, and the method further comprises re-circulating a portion of the cathode outlet flow to the cathode inlet flow to heat the compressed air flow introduced to the cathode inlet.

DETAILED DESCRIPTION

Figure 1:
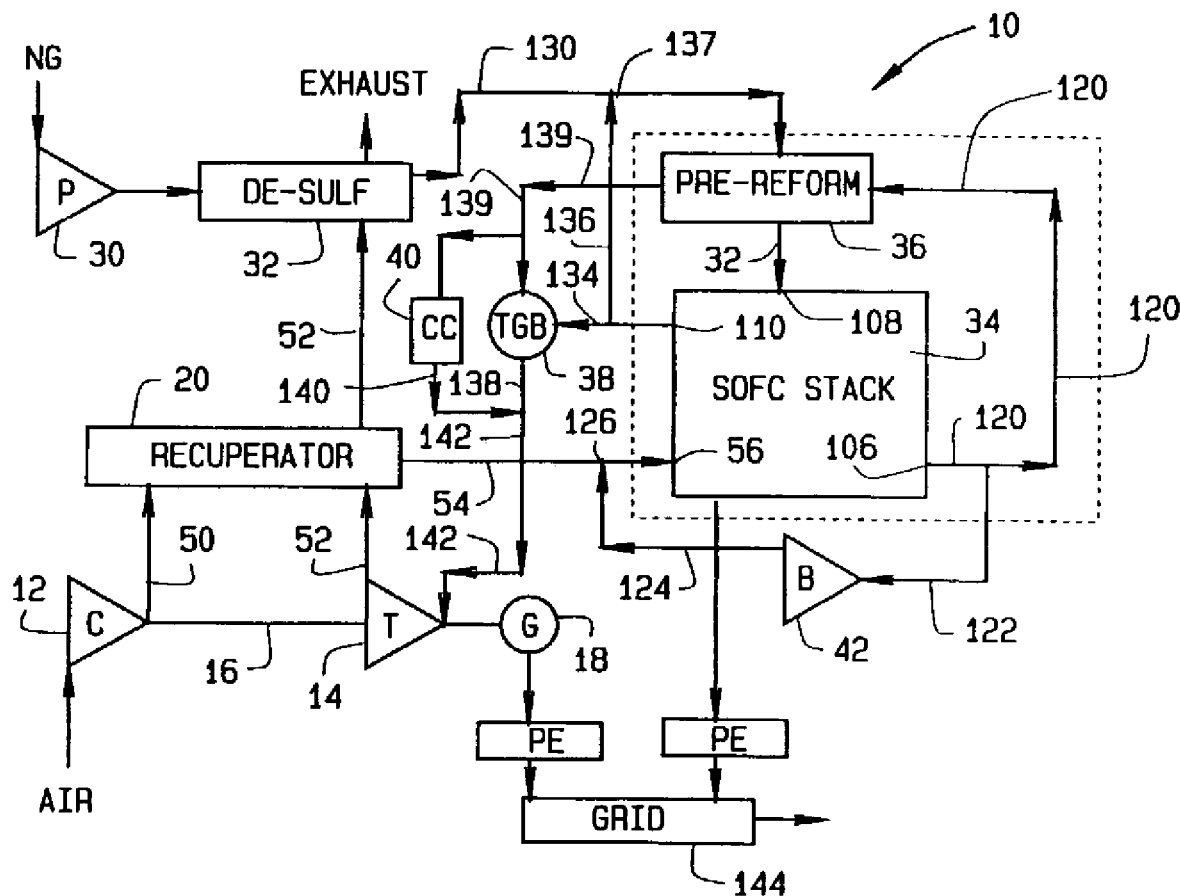
FIG. 1 is a schematic diagram of an exemplary integrated fuel cell hybrid power plant.

FIG. 1 schematically illustrates an exemplary integrated gas turbine and fuel cell hybrid power plant 10 including a fuel cell portion and a turbine portion for producing electricity in tandem with one another. The turbine portion includes a compressor 12, a turbine 14, a rotor 16 by which turbine 14 drives compressor 12, an electrical generator 18, and a recuperator 20. The fuel cell portion includes a fuel pump 30, a de-sulfurizer 32, a fuel cell stack 34, a fuel preformer 36 for fuel cell stack 34, a tail gas burner 38, a catalytic chamber 40 and an exhaust blower 42. As explained in some detail below, while the basic components of plant 10 are well known, efficiency improvements in relation to known plants are obtained through strategic interconnection of plant components with re-circulation flow paths to enhance performance and efficiency of the system. As will be seen below, plant efficiency is improved by recycling air and fuel streams exhausted from the fuel cell portion to extract as much work as possible from air and fuel streams in the fuel cell and turbine portions of the system, and utilizing heat generated in the turbine portion for the benefit of the fuel cell portion.

In operation, compressor 12 is a multi-stage compressor including rows of stationary vanes and rotating blades, and compressor 12 inducts ambient air and produces a compressed air stream 50 at an outlet of compressor 12. The compressed air stream 50 is directed along a flow path toward recuperator 20, which is a known type of heat exchanger including isolated flow paths. Compressed air stream enters recuperator 20 in one recuperator flow path, and a turbine exhaust stream 52 is passed into recuperator 20 in another recuperator flow path, whereby heat from the turbine exhaust is transferred to compressed air stream 50 from the compressor outlet without mixing of compressed air stream 50 and turbine exhaust stream 52. Compressed air stream 50 is therefore heated within recuperator 20 by turbine exhaust stream 52, and a heated compressed air stream 54 exits recuperator 20 and flows to a cathode inlet 56 of fuel cell stack 34 to provide an oxidant therein. By heating compressed air stream 50 with turbine exhaust 52, the costs of conventional heaters and/or regenerative heat exchangers to raise a temperature of the fuel cell oxidant are avoided, and turbine exhaust stream 52 is cooled before being discharged into the atmosphere.

Figure 2:
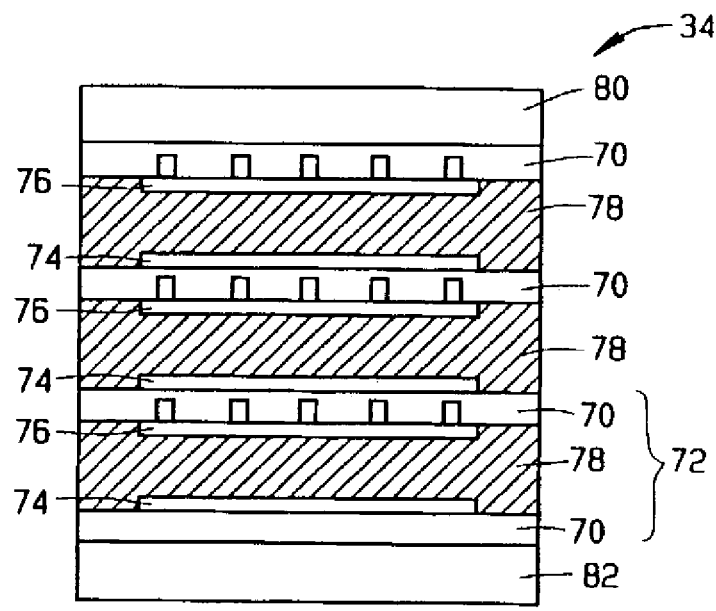
FIG. 2 is a schematic illustration of an exemplary fuel cell stack for the power plant shown in FIG. 1.

In an exemplary embodiment, and in accordance with known fuel cells as illustrated in FIG. 2, fuel cell stack 34 includes a number of interconnects 70, each interconnect 70 defining a fuel manifold. Each interconnect 70 also includes at least one flow field for flowing a reagent, such as an oxidant or a fuel across interconnects 70. Exemplary flow fields in interconnects 70 are formed from metals that possess sufficient electrical conductivity, resist oxidation, maintain mechanical strength and are chemically stable under the operating conditions of the fuel cell.

Fuel cell stack 34 also includes at least one fuel cell unit 72 comprising an anode 74, a cathode 76, and an electrolyte 78 disposed between anode 74 and cathode 76. Electrolytes 78 are impermeable with respect to both the fuel and the oxidant. In an exemplary embodiment, fuel cell units 70 are solid oxide fuel cell (SOFC) units with an oxygen-ion conducting solid electrolyte, such as yttria stabilized zirconia (YSZ), ceria-doped zirconia, or lanthanum strontium gallium manganate, although it is contemplated that in alternative embodiments, fuel cell units 70 may include, for example, proton exchange membrane (PEM) electrolytes, molten carbonate electrolytes or other known electrolyte materials suitable for use in fuel cell stack 34.

Anodes 74 are positioned adjacent to respective interconnects 70 and are configured to be in both electrical connection and fluid communication with interconnects 70. Flow fields of interconnects 70 supply both electrical connection and fluid communication, and the flow fields are configured to guide a fuel flow from a fuel intake manifold to a fuel exhaust manifold over the surface of anodes 74. Likewise, cathodes 76 are positioned adjacent interconnect 70 and are configured to be in both electrical connection and fluid communication with interconnects 70. Flow fields of interconnects 70 provide an electrical connection to cathodes 76 and are configured to guide an oxidant flow, such as air, over the surface of cathodes 76. Interconnects 70 include a number of sealing features to prevent fuel flow over cathodes 76 and oxidant flow over anodes 74.

In order to generate a larger voltage across the stack 34, fuel cell stack 34 includes a number of planar fuel cell units 72 arranged in a vertical stack. As will be recognized by those skilled in the art, the particular configuration of three planar fuel cell units 72 shown in FIG. 2 is for illustrative purposes only, and the specific number of planar fuel cell units 72 included in stack 34 will vary depending on the power requirements of the stack 34. In the illustrated embodiment, each of two pairs of adjacent planar fuel cell units 72 shares an interconnect 70, with the interconnect 70 being adjacent and electrically connected to and in fluid communication with an anode 74 of one of the adjacent planar fuel cell units 70 and with a cathode 76 of the other adjacent planar fuel cell unit 72. For this particular embodiment, each of the interconnects 70, which is shared by the adjacent planar fuel cell units 72, includes a flow field on each side thereof for electrical connection and to provide fluid communication for the adjacent anode 74 and cathode 76 of the neighboring planar fuel cell units 70.

In order to close the stack 34 and to collect electrical current from the planar fuel cell units 72, fuel cell stack 34 includes a top end plate 80, which is disposed above an upper one of the planar fuel cell units 72, and a bottom end plate 82, which is disposed below a lower one of the planar fuel cell units 72. End plates 80, 82 are adapted for current collection, and exemplary top and bottom end plates 80, 82 are formed of ferritic stainless steel. In addition, end plates 80, 82 cap the fuel cell stack 34, preventing the fuel and oxidant from bypassing the fuel cell stack 10. An electric potential between the two end plates 80, 82 is the total voltage of the fuel cell stack 34 and equals the sum of the voltages of the individual cells 72.

Figure 3:
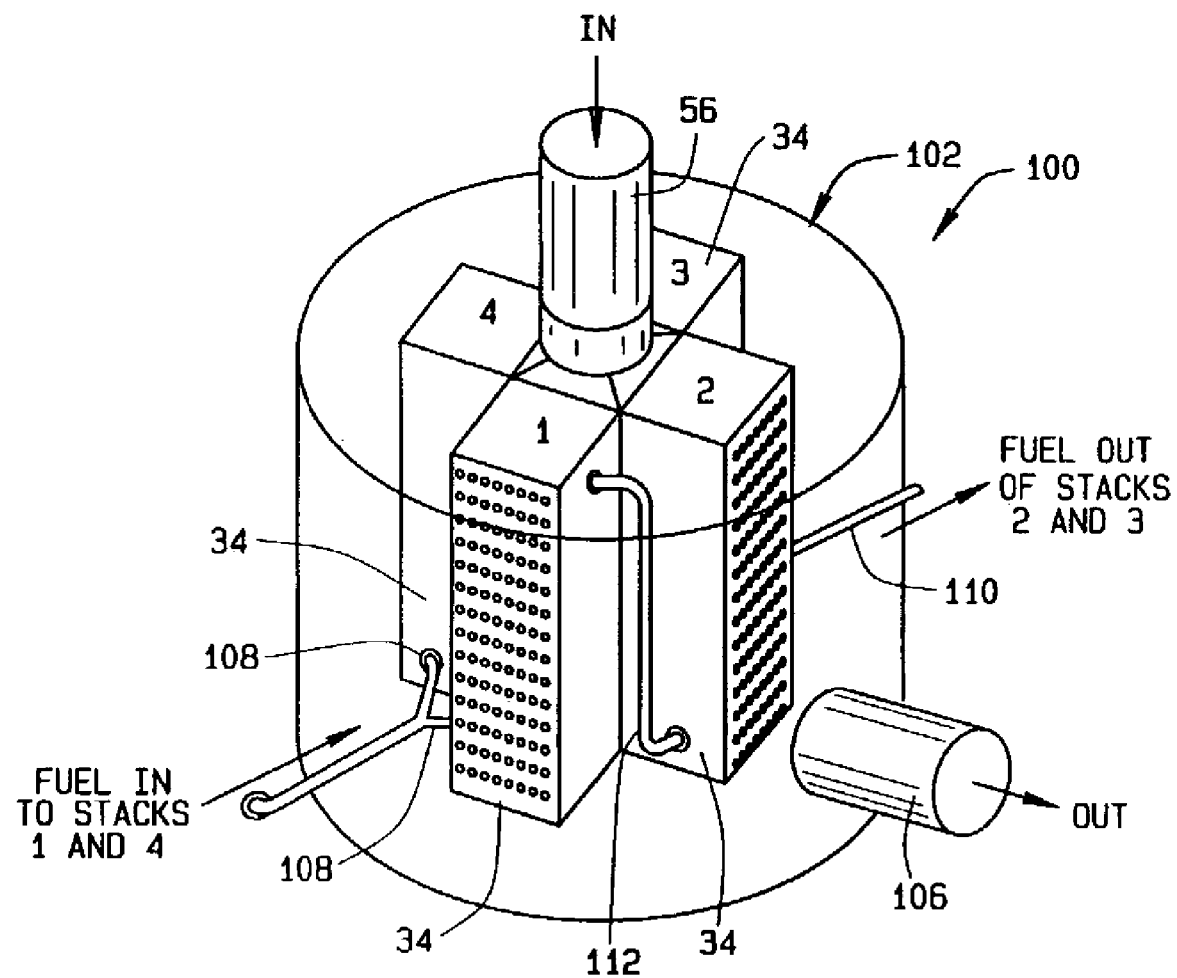
FIG. 3 is perspective view of an exemplary fuel cell module for the power plant shown in FIG. 1.

As illustrated in FIG. 3, fuel cell stacks 34 may be integrated into a module 100 including a vessel 102 having an inlet 56 and an outlet 106, which are configured to respectively receive and exhaust an oxidant, for example air. A number of fuel cell stacks 34 are arranged in a ring within vessel 102. At least one fuel cell stack 34 has a fuel inlet 108, and at least one fuel cell stack 34 has a fuel outlet 110 for receiving and exhausting a fuel flow, respectively. Piping 112 connects stacks 34 to provide fuel flow from one stack to another. Each fuel cell stack 34 includes fuel intake and exhaust manifolds and oxidant intake and exhaust manifolds for receiving and exhausting the fuel flow and the oxidant flow from interconnects 70 (shown in FIG. 2) of the fuel cell stacks 34.

Air inlet 56 and air outlet 106 are referred to herein as a cathode inlet and a cathode outlet, respectively, as they respectively provide oxidant airflow for the cathodes of fuel cells 34. Similarly fuel inlet 108 and fuel outlet 110 are referred to herein as an anode inlet and an anode outlet, respectively, as they respectively provide fuel flow for the anodes of fuel cells 34.

Referring back to FIG. 1, the heated compressed air stream 54 from recuperator 20 enters fuel cell stack 34 through cathode inlet 56 and flows through the fuel cell units in stack 34 to provide an electricity producing chemical reaction with a fuel (discussed below) also flowing through the fuel cell units. Spent air 120 is exhausted from fuel stack 34 through cathode outlet 106 and is partly diverted into a lower pressure re-circulation flow path 122 in flow communication with a pressure increasing device, such as blower 42. Blower 42 raises pressure of the air and expels air therefrom in a higher pressure re-circulation flow path 124 to provide a re-circulated air stream which is fed back to compressed and heated air stream 54 from recuperator 20. The re-circulated air stream in re-circulation flow path 124 is therefore mixed with fresh air stream 54 at a flow path junction 126. Mixing of re-circulated spent air exhausted from fuel cell stack 34 with fresh air 54 through re-circulation flow path 124 is advantageous in several respects.

For example, re-circulation of hot exhaust air from fuel cell stack 34 and mixing it with fresh air from compressor air 54 raises an air temperature at cathode inlet 56 by a direct mass and heat transfer process. A need for diffusive heat transfer provided by a heat exchanger in conventional systems is therefore eliminated. Coupled with turbine exhaust flow 52 in recuperator 20 to heat compressed air 50, a considerably lower cost and less complex heat exchanger, such as recuperator 20, may be employed.

Additionally, re-circulated air from fuel cell stack exhaust 106 via flow path 124 increases an air mass flow rate to fuel cell stack 34 at cathode inlet 56 and facilitates a substantially constant total system air flow rate for increased system performance. The increased air mass flow to stack 34 at cathode inlet 56 produces greater temperature uniformity within the stack and further enhances performance of fuel cell stack 34 As such, higher fuel flow rates are possible for a given constant range of stack temperatures. Higher fuel flow rates at substantially constant total system air flow reduces the amount of total excess air, and thereby raises the firing temperature of turbine 14, as explained below, enhancing overall system performance.

Still further, with sufficient amounts of re-circulated air mixing with fresh air supply 54 through flow path 124, a limit of a stoichiometric operation of the fuel cell stack may be approached relative to the incoming fresh air.

Even further, re-circulated air flow path 124 effectively reduces cathode concentration of $O_2$ concentration in fuel cell stack 34, which is known to be a key degradation mechanism in hot fuel cells. It is therefore believed that re-circulated air flow path 124 provides enhanced performance and longer life of the hot fuel cell stack.

A portion of cathode exhaust 120 that is not diverted to blower 42 for re-circulation flows to reformer 36 in which gaseous hydrocarbons may be reformed, for example, in the presence of steam and a nickel catalyst into hydrogen and carbon monoxide. Heat from cathode exhaust 120 is transferred thereby to reformer 36 which, in turn, heats cooler fuel (described below) flowing into reformer 36 prior to entering fuel cell stack 34. In different embodiments, fuel reformation may be accomplished in an external fuel reformer 36 or in a reformer integral with fuel cell stack 34.

Gaseous fuel, which in different embodiments may be natural gas or a coal derived fuel gas, is driven by fuel pump 30 through a de-sulfurizer 32, which in an exemplary embodiment includes a vessel containing a bed of sulfur sorbent through which fuel flows. Heat from turbine exhaust 52 is transferred to de-sulfurizer 32 to warm fuel therein before being exhausted from plant 10. Complexity and expense of an external heater for de-sulfurizer 32 is therefore avoided, and turbine exhaust is cooled before being discharged from the plant.

De-sulfurized fuel 130 flows from de-sulfurizer 32 to reformer 36 so that fuel may be reformed therein prior to entering the fuel cells of fuel cell stack 34. For example, the fuel is reformed to change its composition from Methane or natural gas to an acceptable composition for reaction in the fuel cell (e.g., hydrogen, $CO_2$, and water). Once treated therein, reformed fuel 132 flows from reformer 36 to anode inlet 108 and into the fuel cells of stack 34. Once expended in the fuel cells, spent fuel 134 is exhausted from fuel cell stack 34 through anode exhaust 110. A portion of the exhausted fuel 134 is diverted into a re-circulation fuel stream flow path 136 that mixes with fresh de-sulfurized fuel 130 at a junction 137. Re-circulation of hot exhausted fuel via re-circulation flow path 136 further avoids external fuel heaters and re-introduces unspent fuel into fuel cell stack 34, thereby increasing fuel efficiency in the system. Re-circulation of exhausted fuel could be accomplished, for example, with a blower, an ejector pump, another pressure increasing device or the like as those in the art will appreciate. In a further and/or alternative embodiment, steam may be introduced to the fuel to facilitate reforming.

A portion of exhaust fuel 134 not diverted to re-circulation stream flow path 136 is fed to a tail gas burner 38 for combustion therein. A portion of the spent (i.e., oxygen depleted) air 139 from fuel cell stack 34 is also fed into tail gas burner 38, and a mixture of spent air 139 and exhausted fuel 134 is combusted in tail gas burner 38. Combustion exhaust 138 is fed to the working fluid paths in gas turbine 14 to provide added heat and pressure for expansion of gas in turbine 14. A portion of spent air 139 not flowing to tail gas burner 38 is directed in a tail gas burner bypass flow path to a catalytic chamber 40 to clean the air therein. Cleaned air 140 from catalytic chamber 40 is mixed with exhaust 138 of tail gas burner 38 prior to entering the working fluid flow paths of turbine 14 to produce a cleaned exhaust stream 142 that is fed to gas turbine 14, thereby reducing emissions from plant 10.

While catalytic chamber 40 is believed to be advantageous in an exemplary embodiment, it is appreciated that the advantages of the invention may be appreciated in the absence of a catalytic chamber without departing from the scope of the present invention.

By controlling injection of spent air 139 and exhausted fuel 134 in tail gas burner 38, it can be ensured that the fuel/air mixture is lean and within flammability limits. Thus, virtually all of the fuel components remaining in the exhausted fuel stream 134 are combusted in tail gas burner, thereby fully utilizing fuel in the system and preventing discharge of fuel in exhaust from plant 10.

Hot exhaust 142 from tail gas burner 38 and catalytic chamber 40 is fed to the working fluid paths of gas turbine 14, and thermodynamic expansion of the exhaust produces work and exerts motive forces therein to drive the turbine, which, in turn, generates electricity in generator 18. Electricity from generator 18 and fuel cell stack 34 are converted to an appropriate form and to a distribution power supply network, illustrated as grid 144 in FIG. 1.

For at least the reasons set forth above, power plant 10 provides better overall plant performance in relation to known systems while providing turbine structural cooling and improved temperature control of the fuel cell stack through re-circulation flow paths and while avoiding complexity and costs of conventional heat exchangers to maintain the fuel cell stack at desired temperatures. Re-circulation of fuel cell stack cathode exhaust also facilitates inlet air temperature control to the fuel cell stack, which, in turn, provides for more precise control of temperature rise and uniformity within the fuel cell stack. Re-circulation of fuel cell stack cathode exhaust provides increased turbine section inlet temperature to provide more work in the turbine, provides for increased performance retention via reduced cathode side oxidation, permits fuel cell stack operation at near stoichiometric conditions, and simplifies exhaust after-treatment before discharging plant exhaust to the atmosphere.

Figure 4:
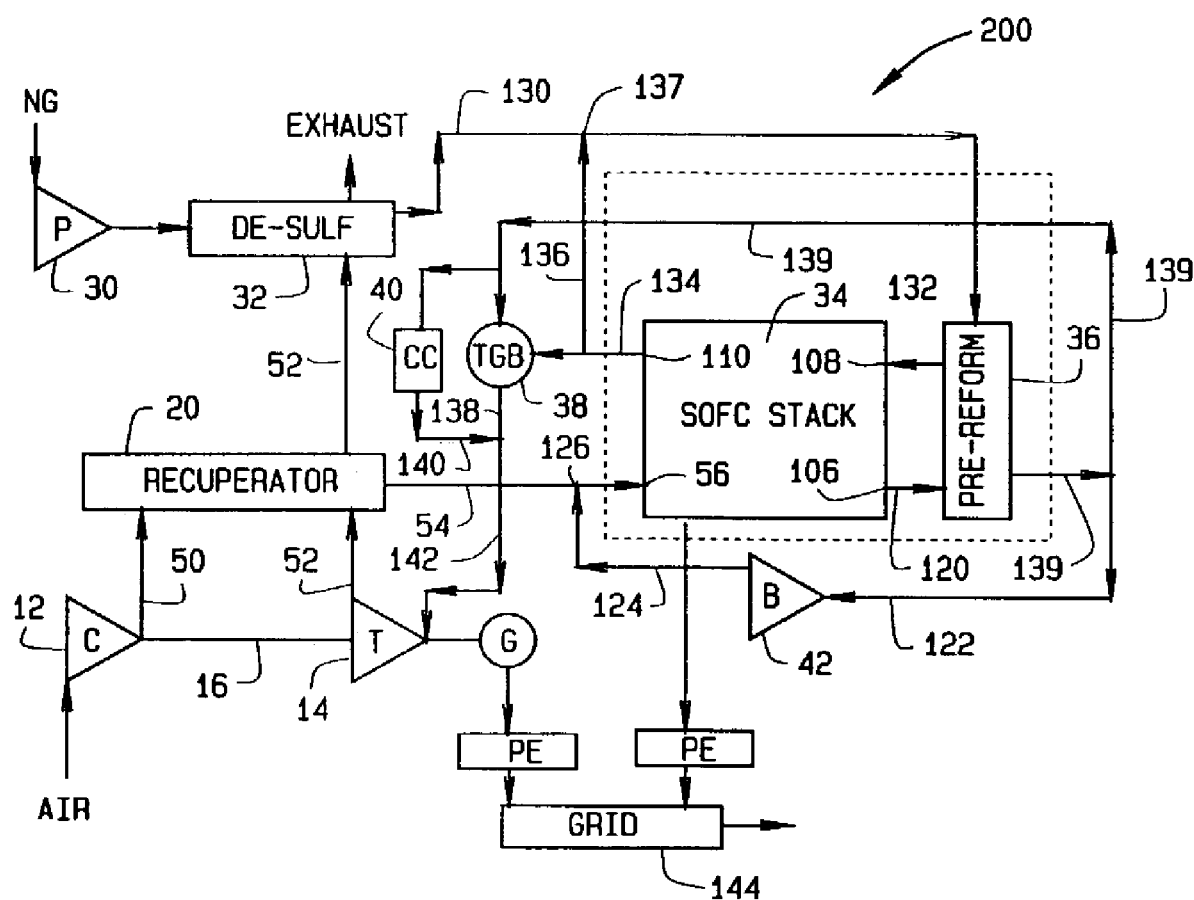
FIG. 4 is a schematic diagram of a second embodiment of an integrated fuel cell hybrid power plant.

FIG. 4 is a schematic diagram of a second embodiment of an integrated fuel cell hybrid power plant 200 sharing the basic components of power plant 10 (shown in FIG. 1) in which like features are designated with like reference characters.

In the gas turbine portion of plant 200, compressor 12 supplies compressed air to recuperator 20, and compressed air within recuperator 20 is heated by turbine exhaust 52 as described above to produce a heated air stream supply to cathode inlet 56. In fuel cell stack 34, the air is reacted with a fuel to generate electricity as described above.

Spent air 120 exhausted from cathode outlet 106 of fuel cell stack 34 is passed to reformer 36. Heat from cathode exhaust 120 is transferred thereby to reformer 36 which, in turn, heats cooler fuel flowing into reformer 36 prior to entering fuel cell stack 34. Cathode exhaust 120 therefore exits reformer 36 as cooled spent air 139. A portion of spent air 139 is diverted to a lower pressure re-circulation flow path 122 fluidly communicating with blower 42. Blower expels spent air in path 122 to a higher pressure re-circulation flow path 124 that is mixed with heated compressed air 54 prior to entering fuel cell stack 34. The benefits of mixing cathode exhaust with fresh air 54 via re-circulation path 124 are noted above.

Gaseous fuel, which in different embodiments may be natural gas or a coal derived fuel gas, is driven by fuel pump 30 through de-sulferizer 32. Heat from turbine exhaust 52 is transferred to de-sulferizer 32 to warm fuel therein before being exhausted from plant 10. Complexity and expense of an external heater for de-sulferizer 32 is therefore avoided, and turbine exhaust is cooled before being discharged from the plant.

De-sulfurized fuel 130 flows from de-sulfurizer 32 to reformer 36 so that fuel may be reformed therein prior to entering the fuel cells of fuel cell stack 34. For example, the fuel is reformed to change its composition from Methane or natural gas to an acceptable composition for reaction in the fuel cell (e.g., hydrogen, $CO_2$, and water). Once treated therein, reformed fuel 132 flows from reformer 36 to anode inlet 108 and into the fuel cells of stack 34. Once expended in the fuel cells, spent fuel 134 is exhausted from fuel cell stack 34 through anode exhaust 110. A portion of the exhausted fuel 134 is diverted into a re-circulation fuel stream flow path 136 that mixes with fresh de-sulfurized fuel 130 at a junction 137. Re-circulation of hot exhausted fuel via re-circulation flow path 136 further avoids external fuel heaters and re-introduces unspent fuel into fuel cell stack 34, thereby increasing fuel efficiency in the system.

A portion of exhaust fuel 134 not diverted to re-circulation stream flow path 136 is fed to a tail gas burner 38 for combustion therein. A portion of the spent (i.e., oxygen depleted) air 139 from fuel cell stack 34 is also fed into tail gas burner 38, and a mixture of spent air 139 and exhausted fuel 134 is combusted in tail gas burner 38. Combustion exhaust 138 is fed to the working fluid paths in gas turbine 14 to provide added heat and pressure for expansion of gas in turbine 14. A portion of spent air 139 not flowing to tail gas burner 38 is directed to tail gas burner bypass flow path and to a catalytic chamber 40 to clean the air therein. Cleaned air 140 from catalytic chamber 40 is mixed with exhaust 138 of tail gas burner 38 prior to entering the working fluid flow paths of turbine 14 to produce a cleaned exhaust stream 142 that is fed to the working fluid paths of gas turbine 14, thereby reducing emissions from plant 200.

While catalytic chamber 40 is believed to be advantageous in an exemplary embodiment, it is appreciated that the advantages of the invention may be appreciated in the absence of a catalytic chamber without departing from the scope of the present invention.

By controlling injection of spent air 139 and exhausted fuel 134 in tail gas burner 38, it can be ensured that the fuel/air mixture is lean and within flammability limits. Thus, virtually all of the fuel components remaining in the exhausted fuel stream 134 are combusted in tail gas burner, thereby fully utilizing fuel in the system and preventing discharge of fuel in exhaust from plant 10.

Hot exhaust 142 from tail gas burner 38 and catalytic chamber 40 is fed to an inlet of gas turbine 14, and thermodynamic expansion of the exhaust produces work and exerts motive forces to drive the turbine, which, in turn, generates electricity in generator 18. Electricity from generator 18 and fuel cell stack 34 are converted to an appropriate form and to a distribution power supply network, illustrated as grid 144 in FIG. 1.

For at least the reasons set forth above, power plant 200 provides better overall plant performance in relation to known systems while providing turbine structural cooling and improved temperature control of the fuel cell stack through re-circulation flow paths and while avoiding complexity and costs of conventional heat exchangers to maintain the fuel cell stack at desired temperatures. Re-circulation of fuel cell stack cathode exhaust also facilitates inlet air temperature control to the fuel cell stack, which, in turn, provides for more precise control of temperature rise and uniformity within the fuel cell stack. Re-circulation of fuel cell stack cathode exhaust provides increased turbine section inlet temperature to provide more work in the turbine, provides for increased performance retention via reduced cathode side oxidation, permits fuel cell stack operation at stoichiometric conditions, and simplifies exhaust after-treatment before discharging plant exhaust to the atmosphere.

Comparing plant 200 with plant 10 (shown in FIG. 1), analysis has demonstrated that plant 200 provides better overall plant performance and efficiency than plant 10, while plant 10 provides more cooling for the turbine than does plant 200.

While the invention has been described in terms of various specific embodiments, those skilled in the art will recognize that the invention can be practiced with modification within the spirit and scope of the claims.

The invention claimed is:

1. A tail gas burner system comprising:
   at least one fuel cell comprising an anode, a cathode and an electrolyte interposed therebetween, said anode comprising an anode inlet and an anode outlet and said cathode comprising a cathode inlet and a cathode outlet;
   a tail gas burner comprising a tail gas inlet and a tail gas outlet coupled to said anode outlet and said cathode outlet for oxidizing at least a portion of an anode outlet flow with at least a portion of a cathode outlet flow to produce a tail gas burner outlet flow; and
   a tail gas bypass flow connected to said cathode outlet and to said tail gas burner outlet for bypassing a portion of said cathode outlet flow around said tail gas burner.

2. A tail gas burner system in accordance with claim 1 further comprising a catalytic converter disposed between said tail gas burner bypass flow and said tail gas outlet for oxidizing any anode leakage present within said bypassing portion of said cathode outlet flow.

3. A tail gas burner system in accordance with claim 2 further comprising a gas turbine coupled to said tail gas burner, wherein said tail gas burner outlet flow and said tail gas burner bypass flow exert motive forces upon said gas turbine to produce work.

4. A tail gas burner system in accordance with claim 3, further comprises a heat exchanger coupled to said gas turbine for recovering heat from a gas turbine exhaust.

5. A tail gas burner system in accordance with claim 4 wherein said heat exchanger is coupled to at least one of a compressor outlet, an anode inlet, a water supply, or a cathode inlet for exchanging heat therewith.

6. A tail gas burner system in accordance with claim 4 wherein said heat exchanger is coupled to a de-sulfurization system for exchanging heat therewith.

7. A tail gas burner system in accordance with claim 1 further comprising a gas turbine coupled to said tail gas burner, wherein said tail gas burner outlet flow exerts motive forces upon said gas turbine to produce work.

* * * * *